(12) United States Patent
Abrams et al.

(10) Patent No.: US 7,716,244 B2
(45) Date of Patent: May 11, 2010

(54) MULTI-ORGANIZATIONAL INFORMATION MANAGEMENT SYSTEM

(75) Inventors: Wayne A. Abrams, Shawnee, KS (US); Joe G. Abrams, Shawnee, KS (US); Kathleen J. Bell, Shawnee, KS (US); Wing-Lik Choi, Mission, KS (US); R. Scott Firebaugh, Olathe, KS (US)

(73) Assignee: Apex Innovations, Inc., Olathe, KS (US)

( * ) Notice: Subject to any disclaimer, the term of this patent is extended or adjusted under 35 U.S.C. 154(b) by 277 days.

(21) Appl. No.: 11/945,501

(22) Filed: Nov. 27, 2007

(65) Prior Publication Data

US 2008/0077593 A1    Mar. 27, 2008

Related U.S. Application Data

(63) Continuation of application No. 10/185,988, filed on Jun. 28, 2002, now Pat. No. 7,305,392.

(60) Provisional application No. 60/338,307, filed on Nov. 2, 2001.

(51) Int. Cl.
*G06F 17/30* (2006.01)
*G06F 7/00* (2006.01)

(52) U.S. Cl. .................................. 707/785; 707/789
(58) Field of Classification Search .................... 707/9, 707/5, 200, 100
See application file for complete search history.

(56) References Cited

U.S. PATENT DOCUMENTS

2002/0128904 A1* 9/2002 Carruthers et al. ............ 705/14
2007/0124296 A1* 5/2007 Toebes ........................... 707/5

* cited by examiner

*Primary Examiner*—Charles Rones
*Assistant Examiner*—Fariborz Khoshnoodi
(74) *Attorney, Agent, or Firm*—Polsinelli Shughart PC

(57) ABSTRACT

A multi-organizational information management system provides for full lifecycle tracking of business activities of a complex mix of governmental entities and business organizations by maintaining a secure database of data entities or records to track such activities. The system provides for secure sharing of information among the governments and organizations by controlling access to data entities based on organizational membership and assigned role of system users. The system provides flexible structural relationships among the various data entities. A graphic, web-based user interface of the system enables efficient access to the data entities for entry and update of specific data.

6 Claims, 9 Drawing Sheets

FIG. 3.

Address

| Label | Value | Ref |
|---|---|---|
| Line 1 | 12345 Century Ave | 143 |
| Line 2 | | |
| Line 3 | Apt. #101 | 144 |
| City/Place | Olathe | 145 |
| State/Province | KS | |
| Postal Code | 66062 | 146 |
| Extra Postal Code | 5678 | 147 |
| Country | USA | |

| Label | Value | Ref |
|---|---|---|
| Address Type | Residential ▼ | 142 / 141 |
| Mailing | X | 150 |
| Shipping | X | |
| Billing | X | 159 |
| Share Value | 32 | 155 / 157 |
| Place Type | City | 151 |
| County | Johnson | 148 |
| Time Zone | Central ▼ | 149 |

| Entity Permissions | | | | | | | | |
|---|---|---|---|---|---|---|---|---|
| Entity | Role | View | Update | New | Copy | Delete | Move | Edit SV | Default SV |
| Bid ▶ | Bid Coordinator ▶ | □ | □ | □ | □ | □ | □ | □ | □ |
| Bid ▶ | Bid Manager ▶ | □ | □ | □ | □ | □ | □ | □ | □ |
| Project ▶ | Project Manager ▶ | □ | □ | □ | □ | □ | □ | □ | □ |
| Project ▶ | Inspector ▶ | □ | □ | □ | □ | □ | □ | □ | □ |

FIG. 5.

| Share Value | Share Level | |
|---|---|---|
| 1 | Private | □ |
| 2 | My Org | □ |
| 4 | Org Descendants | □ |
| 8 | Org Predecessor | □ |
| 16 | Org Siblings | □ |
| 32 | All | □ |

MULTI-ORGANIZATIONAL INFORMATION MANAGEMENT SYSTEM

CROSS-REFERENCE TO RELATED APPLICATION

This is a Continuation of U.S. patent application Ser. No. 10/185,988 filed Jun. 28, 2002 for MULTI-ORGANIZATIONAL PROJECT MANAGEMENT SYSTEM, now U.S. Pat. No. 7,305,392, which claims priority under 35 U.S.C. 119(e) and 37 C.F.R. 1.78(a)(4) based upon U.S. Provisional Application, Ser. No. 60/338,307, filed Nov. 2, 2001, the disclosures of Ser. No. 10/185,988 and Ser. No. 60/388,307 being incorporated herein by reference.

BACKGROUND OF THE INVENTION

1. Field of the Invention

This invention relates to information management and, more particularly, to a system adapted to improve collaborative work and communications across organizational boundaries to manage projects, programs, and community and emergency events.

2. Description of the Prior Art

Increasingly, governance organizations have difficulties planning, managing, and tracking the thousands of projects, programs, and events, many of which are cross-jurisdictional. As an example, each year, these organizations miss valuable funding opportunities or miss submittal deadline dates resulting in loss of funding. They have minimal visibility regarding the accuracy of estimates, project status, and funding status. Delays in communication result in delayed action at each step and ultimately compound into unnecessarily long, inefficient and protracted processes. There is no software application on the marketplace that facilitates and tracks all information needed to truly manage the full lifecycle of these public and private projects, programs, actions, and events.

There are various software packages that could be deployed, but they do not create a comprehensive, cohesive and intuitive system that is easy to use. Most implementations of these software packages are Client/Server applications, not pure web applications. This means that the scope of users is limited to the intranet of the organization, or perhaps an extranet. Even newer packages that are web based are not implemented in such a manner as to provide seamless user operation across hundreds of organizations. These software packages offer some functionality, yet miss satisfying these and other critical needs within this community of organizations. None of these application software vendors are building subscriber-shareable knowledge-bases. The software development activities of these vendors are generally oriented to solving the problems of corporations or traditional businesses and not the problems of multi-agency public and private groups.

For example, there are various types of softwares that provide for some of the needs of government organizations, but fall short of delivering the breadth and functionality that is really needed by governance applications.

Collaborative Groupware Software offers contact databases, calendars, "to-do" lists, e-mail messaging and document organization. They do not have any governance specific applications (e.g. funding, estimating, etc.) nor do they automatically track communications per any entity.

ERP systems, or Enterprise Resource Planning systems, operate based on products, product sales, inventory for distribution, profitability and other issues that are not germane to government related organizations and, further, do not offer the functionality needed for multi-agency use. This type of software can not be easily or effectively applied to government applications. Although there have been attempts to customize business software for some government applications, the organization often gives up the ability to effectively maintain the software because of new version releases that require additional customization to continue operation in the government environment. Even then, they cannot track multiple funding sources over numerous fiscal years.

Program & Project Management Systems are software packages that allow users to develop Gantt type project plans (similar to Microsoft Project). Most of these systems are used by one person, the project manager, who updates the plan and task dates by verbal communications and status meetings. None offers the ability for team members, from different organizations, to update plan dates and information. Some offer the ability to view programs or multiple projects. None offers the capability of multi-jurisdictional planning, nor do they allow users to set precedence on projects, instead of just tasks. Furthermore, these systems support the user plan at the task level, which quickly becomes overwhelmingly difficult when thousands of projects need to be managed. Governance communities need a system that can help them manage projects at a higher level, and help manage contractors and roles instead of individuals. None of the known program and project management systems supports true governance lifecycle, from project request to warranty.

Construction Integrated Systems are software packages that track the financial information and handle job costing for construction type firms. Many of the functions that are needed by contractors are available in such software. Still contractors do not have automation for the bid and contract paperwork/forms or message triggers for pre-construction meetings and have no means to work with a city government to receive payment quicker using web forms and e-pay functions. Furthermore, these systems are limited to a contractor's enterprise; they do not easily "rollup" and manage subcontractors or work collaboratively with city project managers, inspectors, and utility coordinators.

Spreadsheet Templates—There are a multitude of small software templates that track everything from assets, estimating, petitions, facilities, and the like. This software, however, does not have the ability or structure to handle large volume applications. Currently, federal, state, regional, and municipal governance organizations, as well as the private sector, do much of their required work by e-mailing spreadsheets and mailing associated documents among various personnel. Many standalone spreadsheet and commercial database applications exist, some with good functionality; but they cannot be employed enterprise-wide or multi-organizationally.

Other Point Solutions—There are a multitude of other software packages that provide point solutions such as estimating, work order management, timekeeping, performance management, and the like. These are usually not enterprise systems and provide little, if any, ability to develop standards and share information with others.

None of the software listed above addresses the needs of governance type organizations with their unique multi-level independent and overlapping multi-organizational boundaries. Further these traditional types of software do not allow the creation of individual user interfaces and permissions, nor do they allow independent self created and maintained user records. Further, traditional software does not combine permission based access, allow a user to create an interface for a particular job function, and is not designed to provide automatic escalation of information both within an organization and across multi-organizational boundaries.

SUMMARY OF THE INVENTION

The present invention provides a multi-organizational information management method and system which manages and processes both structured and unstructured data, using data entity oriented design concepts and document management core functionalities to solve problems associated with managing multi-jurisdictional activities for governance organizations or for managing other projects, programs, events, actions, incidents, contracts, bids, funds or exercises involving multiple unrelated organizations. Any information or data relating to these projects, programs and the like generally may be referred to as data entities. The system allows management of such projects, programs, or other data entities throughout their entire lifecycle. It allows multiple people, from multiple organizations, to enter and update information and data related to the data entities, allowing information to be entered at its source.

The system, adapted for governance type applications, incorporates and integrates documentation and reporting standards at the Federal, State, Regional, and Local (FSRL) level for collaboration and information sharing, with flexibility allowed for each user organization preference. In a preferred embodiment of this invention, "aliases" or user devised nomenclature can be used by subscriber organizations to label information using language specific to that organization, without eliminating the ability of other subscriber organizations to aggregate and effectively use this information under pre-defined system categories. This feature is particularly important in funding where the ability to track both internal and external funding per project and manage and allocate fund pools at any FSRL level is critical to the efficient operation of multi-organizational activities. The shared knowledge-base and ability to set data entity naming standards also allow for system, subscriber organization and user statistics to be captured and reported in a way meaningful to each subscriber and across subscriber communities to further aid in the development, subscriber adoption and sharing of "best practices".

The information management system of the present invention provides project-centric organization of information to users by capturing all information related to any designated project, including, but not limited to strategies, goals, requests, estimates, plans, skills, resources, schedules, documents, maps, drawings, alerts and notices. The system allows full project tracking from initial concept through warranty, which for governance organizations can commonly take place over 10 or 20 years. In a preferred embodiment of this invention, the system allows multi-jurisdictional aggregation of information with permission-based access for the appropriate user.

The present invention provides for creation of a unique user interface from a set of predefined entities, using a drag and drop methodology to dynamically create data entity structures and define the properties of how each entity will appear and operate on a web interface. An entity structure may be defined as a particular entity with a relationship to a series of other entities or sub-entities.

The present invention provides a method and system to dynamically configure and reconfigure user screens based on subscriber organization preferences. In a preferred embodiment of this invention, this is accomplished using a "meta-view" which allows the creation and management of user screens based on the information type. In this case, the meta-view contains control data about entity or object.

A feature of the invention is a design such that the system operates from a single shared instance of subscriber owned, and user group maintained, information. That is, any particular piece of data or data entity only needs to be entered and stored once, with subsequent references or "pointers" to such data. The system employs a data base structure that allows the entities to act either independently or in a dependent relationship with another entity. For example, an entity called "memo" could be deployed beneath entities named "bid" and "contract" or other selected entities. In this case, all memos relating to the entities bid and contract would automatically be stored with the particular entity context, so that the memo would be electronically filed with the proper bid, contract, or other selected entity.

A further feature is that indexing information throughout the system is organized through standardized classifications or taxonomies to assist in easier access, simplified business rules management, and more uniform documentation and reporting. The indexing structures combined with the single instance of information facilitates the development, adoption, and sharing of best practices among users.

The present invention provides a system whereby each project can be linked into the user's organizational strategies, goals, and objectives. This not only provides decision information during project planning, but enables changes in those project plans and project execution to be monitored and reported to relevant stakeholders. Each project can also be linked to the goals and objectives of each user, based on their role assignment. Desired skills and abilities for each role are recorded in the system and used by each user and their management to define gaps in project needs and establish developmental goals to enhance user and project performance.

Further, the present invention improves upon traditional project management software in that the present system architecture is designed to operate at an activity level not a task level. Furthermore, it allows prioritization of thousands of projects.

The present invention provides a system and method through which interaction with the system knowledge-base can assist any user to further deploy system functions or gain added benefits. Since the preparation and implementation of this system is yet another type of project, a new subscriber organization will be able to start small, gain immediate benefit with a few system features and, with the system's business rules and knowledge-base assisting them, perform more of the staged implementation activities using internal resources.

The present invention provides a system whereby each user is responsible for their own contact record, thus not requiring any subscriber organization to be responsible to ensure the accuracy of the thousands or millions of records within their domain. In a preferred embodiment of this invention, the system can periodically contact each user and ask for a record update of the contact information. In the event the user does not respond appropriately, the system can automatically escalate the query to a higher management level to ratify the update contact request. The system is capable of benchmarking the accuracy of the contact data base by periodic automatic contact audits. In a preferred embodiment, business rules can be set as a standard or project specific by subscriber organization, information owners, or any stakeholder to push information to a user; or the user can elect to set business rules to pull the information to the user interface.

The present invention provides for the definition of data "entities" or types of data records which are used to record the types of information required to manage projects, programs, actions, events, plans, and other work activities which tend to be large in overall scale and which overlap multiple organizations. Data entities can exist on their own and can also be components of other data entities. Each entity includes a plurality of data fields which are appropriate for the specific data entity. Examples of data entities include, without limitation, person, organization, role, account, fund, address, email, phone, project, bid, contract, and so forth. Actual data entities are created using predefined data entity forms or templates which are filled-in or populated with data, named, and saved to create working data entities. New data entity templates can be defined as needed within the present invention.

The present invention provides for the definition of organizational roles, which are also data entities. A "role" in the present invention is the means by which rights or permissions to specific data entities are granted to specific persons. As defined within the present invention, a role has a standard name and a default set of entity permissions. Such permissions may include the capability to read, modify, copy, delete, or create a given entity. Roles are assigned to persons within organizations, and some persons may have multiple roles. If a person has multiple roles, their current entity permissions are determined by their merged role permissions. Roles may be roughly comparable to job titles, and permissions associated with particular roles reflect the degree of responsibility of the role and the need for access and the type of access to various data entities. Roles range from high-level decision making persons to low-level support staff.

The present invention provides capabilities to manage data related to projects or activities of subscriber organizations. As used herein, the term "organization" is meant to include any type of governmental agency or authority, corporate or business group, or any subdivision or department thereof, and any mix of such groups. An organization "subscribes" to or enrolls in the system of the present invention by having an organization account created along with an organization data entity, which identifies the organization and a person, or persons, associated with the organization who is authorized to configure data entities of the organization, including roles, and the capability of enrolling personnel of the organization into the system and the assignment of roles to such personnel. In assigning roles to persons, an organization administrator may accept the default data entity permissions associated with a role or may adjust the permissions with respect to a given role as needed, but only within their own organization.

The data management system of the present invention has the capability of allowing some data entities to be made available to all subscribers for viewing and updating or to make some data entities available only to a particular subscriber organization and to change such availability as needed. This is accomplished by controlling access to data entities based on organizational, role, individual rights or permissions to data entities, and even specific data fields.

Other objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 3 is a diagrammatic representation of an exemplary interactive data entity template within the present invention to enable creation of a corresponding data entity.

FIG. 4. is a diagrammatic representation of an interactive entity permission form for assigning data access permissions for various data entities to various roles within the present invention.

FIG. 5 is a diagrammatic representation of an interactive share value selection form for assigning a share value sum to a data entity within the present invention.

DETAILED DESCRIPTION OF THE INVENTION

Figure 1:
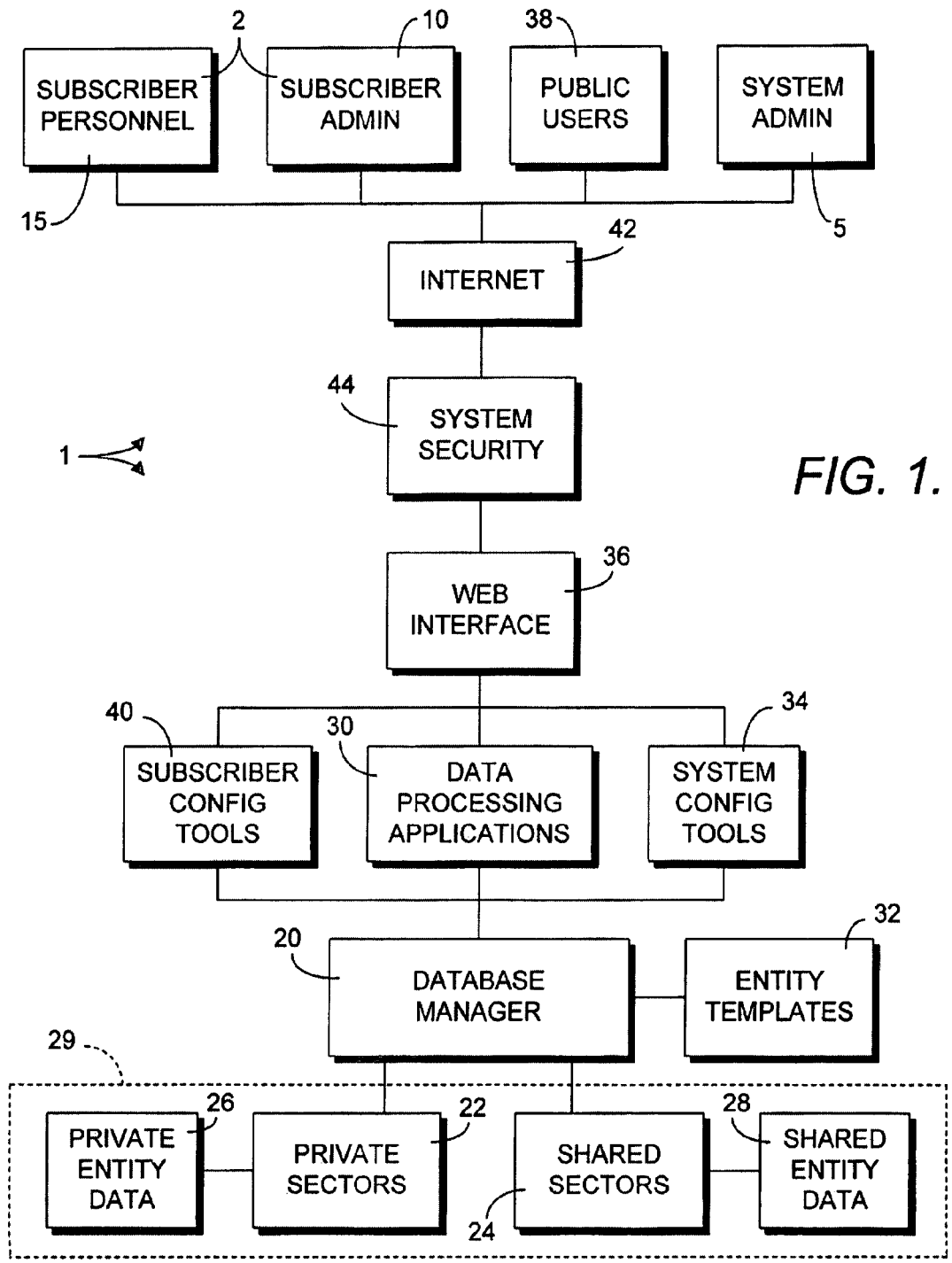
FIG. 1 is a block diagram illustrating principal components of a system architecture of a multi-organizational information management system which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the present invention comprises a web enabled computer system 1 adapted to facilitate information management for projects involving multiple, unrelated subscriber organizations throughout the project lifecycle. The computer system 1 is designed to collect data regarding projects from multiple organizations, subscribing organizations or subscribers 2, participating in the project and subscribing to the computer system 1. The computer system 1 uses a multi-layer security structure and a "data entity" or "entity" based design that allows multiple organizations to work within the system while controlling access to their respective data.

Although the computer system 1 may be adapted for use with a wide range of projects, programs, events, actions or exercises it is described herein with reference to public works type projects such as a road or bridge type project. Such public works type projects often involve multiple governmental jurisdictions, agencies or departments, various funding organizations, and a large number of contractors and subcontractors. For a road project involving multiple jurisdictions, such as several cities or a county and several cities, the governmental entity having the largest interest in the project or the greatest resources will typically act as the project leader which may also be referred to as the lead organization.

The computer system typically 1 will be maintained and operated by a third party system administrator 5. Each of the participating organizations appoints an organization or subscriber administrator 10 to handle administration and oversee use of the computer system 1 for its organization. The organization administrators 10 then provide access to the computer system 1 to individuals in the organization 2 who can benefit from its use. These individuals may generally be referred to as end users, users or subscriber personnel 15.

The system architecture on which the computer system 1 of the present invention is generally run is shown schematically in FIG. 1. The system 1 includes a database manager program 20 which is used to maintain private database sectors 22 and shared database sectors 24. The private sectors 22 store data related to the business activities and projects of the subscriber organizations 2 in the form of private data entities or records 26 which can only be accessed by selected personnel 15 of the organization 2 who entered the data entities 26. Similarly, the shared sectors 24 store shared entities 28 which can be accessed by multiple organizations 2 or by all subscriber organizations 2. The private sectors 22 and shared sectors 24 represent extremes of a range of access control within the system 1 to control or enable access to data generated by organizations 2 to other organizations 2 or personnel 15 which may range from totally private and accessible by a single person 15 to totally public and accessible by all users. The private or partially private sectors 22 and shared or partially shared sectors 24 constitute a composite database 29.

The private entities 26 and shared entities 28 are created, updated, and maintained generally through data processing applications 30 using predefined entity templates 32. The data processing applications 30, as will be described more fully below, are software and/or procedures within the system 1 which enable the subscriber organizations 2, through their personnel 15, to enter data to manage their projects and activities.

The system 1 includes system configuration tools 34 which enable the system administrator 5 to enroll or set up the subscriber organizations 2 within the system 1, along with subscriber administrators 10. The system tools 34 enable the system administrator to define and modify the entity templates 32, as well as to create and modify the user interface 36 presented to users 15 who access the system 1, which may include the general public 38, particularly for a system 1 adapted for governmental entities. The system 1 includes subscriber configuration tools 40 which enable the subscriber administrator 10 to enroll the subscriber personnel 15 into the system 1, assign roles to the personnel, and to customize certain aspects of the system 1, as applied only to use by the organization 2 by whom the particular system administrator 10 is employed, such as certain aspects of the user interface 36 as presented to the organization's personnel 15.

The system 1 is intended to be accessed by a large number of personnel 15 within a large number of organizations 2, and often the general public 38. In a preferred embodiment of the system 1, access to the system is provided over a universal computer network, such as the internet or world wide web 42 using conventional web browsers. Thus, the user interface 36 is actually a web interface and is presented to the users 15 and 38 as web pages which may be interactive or static, depending on the rights or permissions provided to the users 15 and 38. Because the system 1 makes use of the universal connectivity provided by the internet 42, the system 1 incorporates a number of system security measures 44. Preferably, the security measures 44 include such conventional techniques as firewalls to prevent unauthorized access to the system 1. On the positive side, the security measures 44 manage log-in procedures of enrolled personnel 15, subscriber administrator 10, and personnel of the system administrator 5. The system security measures 44 may also require a registration process of public users 38 so that the system 1 can record accesses by the public users 38. Conventionally, the security measures 44 may require entry of a user name and password, which have been previously established.

The system 1 includes hardware and software components. The system 1 may be implemented either as a large single server system or as a multiple server system with individual servers dedicated to specific functions. The system 1 may occupy a single physical site or may be distributed over separated sites. The system 1 may incorporate "mirrors" of the composite database 29 and other critical components of the system 1, for reliability and quick restoration of such components in the event of service interruptions or malfunctions.

Granting Data Access Rights and Permissions

Figure 2:
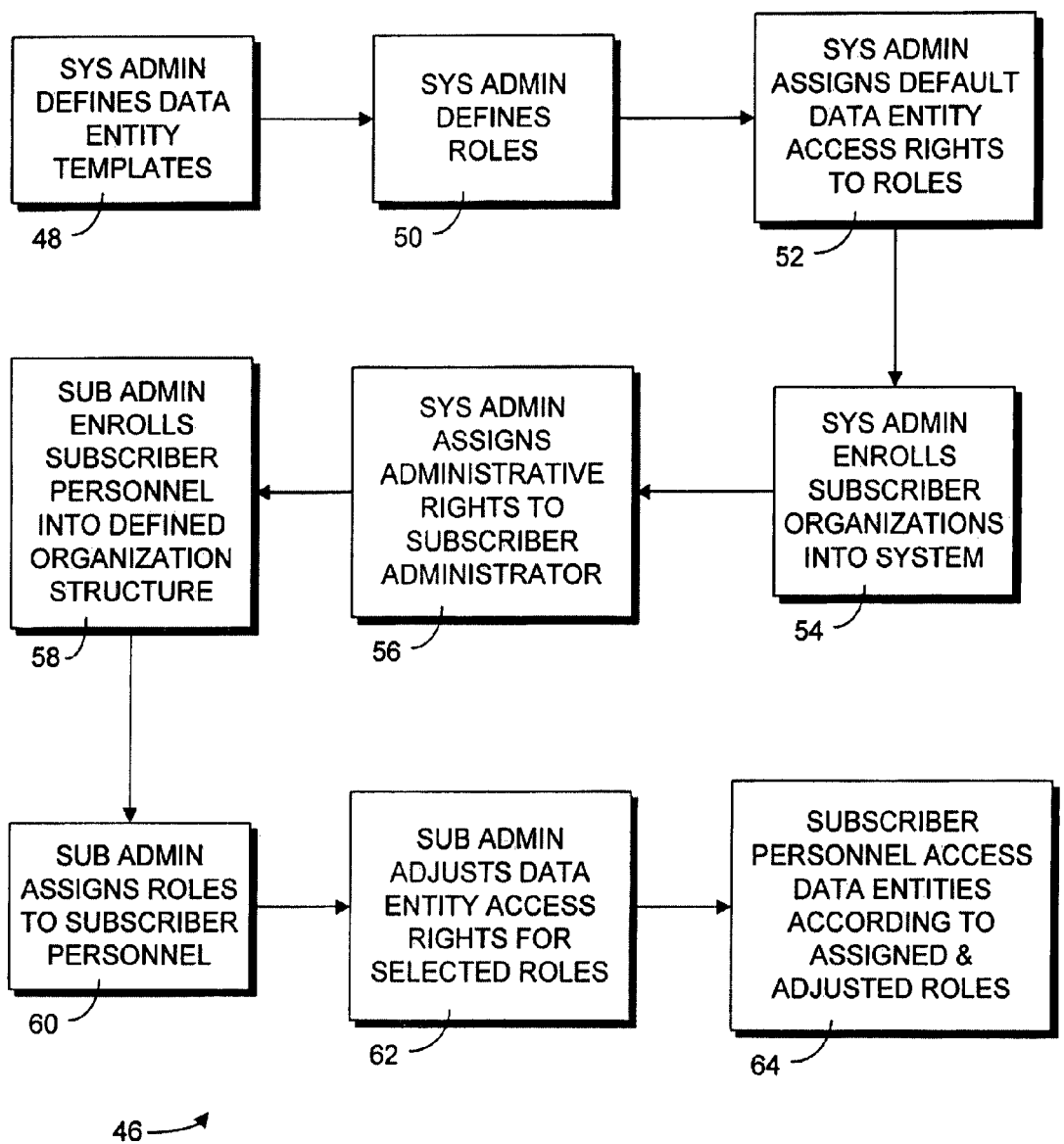
FIG. 2. is a flow diagram illustrating major steps in conveying access rights to data entities within the system of the present invention.

FIG. 2 illustrates a data rights transfer process 46 for granting data access rights or permissions to personnel within organizations 2 of the system 1. At step 48, the system administrator 5 (sys admin) defines the data entity templates 32 and, at step 50, defines the organizational roles. The system administrator 5 assigns default data entity access rights to the respective roles, at step 52, depending on the data rights likely to be needed within a given role. The system administrator 5 enrolls subscriber organizations 2 into the system 1 at step 54 and assigns organizational administrative rights to a subscriber administrator 10 of each subscriber organization 2 at step 56.

At step 58, the subscriber administrator 10 (sub admin) enrolls subscriber personnel 15 into the system 1 and assigns roles to the personnel at step 60. The roles assigned at step 60 carry the default sets of rights which were associated with the particular roles at step 52. At step 62, the subscriber administrator 15 may adjust the data access rights assigned to particular roles, as needed, for functioning of those roles within the particular organization 2. It should be noted that the subscriber administrator 10 may assign multiple roles to any given person 15 and that the personnel 15 may include individuals other than employees of the organizations 2. Once the roles have been assigned to personnel 15 at step 62, they may access data entities 26 and 28, at step 64, according to the particular roles assigned to them and as adjusted in step 62 and according to their organizational membership.

FIG. 4 diagrammatically illustrates an interactive entity permission form or screen 70 which facilitates assignment of data access rights and permissions to various roles in step 52 of FIG. 2 by a system administrator 5 and the adjustment of rights associated with roles at step 62 by a subscriber administrator 15. The form 70 is a two dimensional matrix and includes a vertical column of row activation check boxes 74, a column of entity names 76, a column of role names 78, columns of data entity access rights check boxes 80, and a column of default share value (SV) entry boxes 82. Share values will be described in further detail below.

Each horizontal row combines an entity name 76, with a role name 78 and enables selection of the entity rights check boxes 80 and entry of a default share value 82 for that combination of entity 76 and role 78. The entity name 76 and role name 78 are shown as "drop down" boxes and each includes a respective list of predefined names for entities 76 and roles 78. Selection of any of the rights check boxes 80 enables that particular data access rights for the corresponding combination of entity 76 and role 78. The illustrated data entity access rights 80 includes the actions of viewing the entity 76, updating or modifying the entity, creation of new entities of that name 76, and copying, deleting, moving, and editing the default share value 82 of the entity 76. Alternatively, fewer or additional data entity access rights may be included in the form 70. The form 70 may include a scroll bar 84 to enable scrolling up and down among a large list of rows of entities 76 and roles 78. The form 70, like most of the setup and management functions of the system 1, is adapted for implementation as a web based interface.

Data Entities

As used herein, the entities or data entities 26 and 28, or collectively entities 90 (FIG. 6), are software objects in the computer system 1 that have associated data to record and track business activities of the subscriber organizations 2. The entities 90 include primary entities 92 and component entities 94. The component entities 94 may be assembled to form an entity structure 96 composed of primary entities 92 including one or more component entities 94. A primary entity 92 with the same entity name as a component entity 94 may be exactly the same as the component entity 94 or may include further data objects or component entities 94 associated with it to receive appropriate data to identify and track changes in the primary entity 92.

Figure 6:
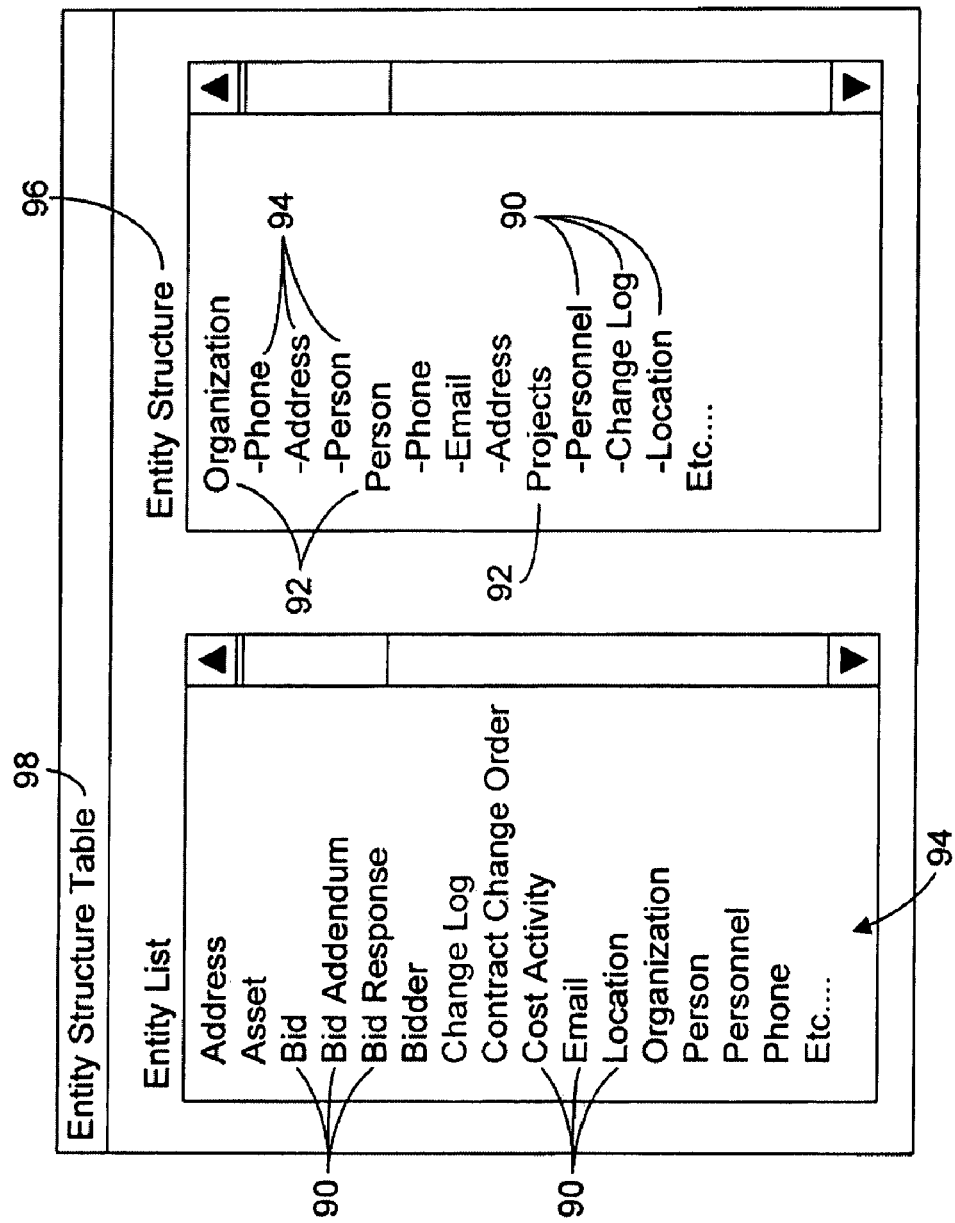
FIG. 6 is a diagrammatic representation of an entity structure table form for assembling an entity structure or tree of common data entities from primary data entities.

The creation of a basic entity structure 96 is preferably performed by the system administrator 5 using a software form such as the entity structure table 98 illustrated in FIG. 6. If further common entities 94 need to be created or if refinements in the constituent primary entities 92 of a common entity 94 are required for a particular subscriber organization 2, this may be accomplished by the system administrator 5, in cooperation with the subscriber administrator 10 of the associated organization 2. Once the entity structure 96 has been created and data filled into the various entities 90, the system 1 has a great deal of flexibility in representing the structural relationships of the entities 90, as will be detailed further below.

Definitions of a number of exemplary entities 90 are detailed below. These entity definitions will become clearer when considered in the context of the examples of entities provided. It is to be understood that the listing of entities 90 provided is not intended to be comprehensive. The listed entities 90 are entities which are relevant to public works type projects. Different entities 90 might be more useful in different types of projects, programs or events although some of the entities will find universal application regardless of the type of project or program with which the system is utilized.

Address is a component entity and is utilized to capture location, shipping, mailing and other types of addresses. Data included in the address entity may include: type of address (i.e. mailing, shipping, billing); street address (for which a plurality of lines of information may be collected); city, place or town; state or province; zip code or postal code; county; country; time zone and usage. The address entity is often structured under or associated with Asset, Organization or Person entities.

Asset is typically structured as a primary entity or under an entity called Project. This allows a user to track assets per project or to track projects per asset. Asset is used to capture information about the asset, such as a bridge, street, sidewalk, storm sewer, sanitary sewer, tree, etc. Data includes, but is not limited to: Asset Type, Asset Number and Asset Condition.

Bid is typically structured as a primary entity or under an entity called Work Packet. A bid is a document which lists line items that the Purchaser wants a bid (pricing) from a Bidder. Bid data includes, but is not limited to: Bid ID, Bid Name, Bid Type, Bid Status.

Bidder is an entity, typically structured under Bid. A Bidder is an organization that is given a Bid. Data includes, but is not limited to: Bidder ID, Bidder Primary Organization, Response Received.

Change Log is a component entity, typically structured under Project. Its purpose is to log major events that impact a project. Data includes, but is not limited to: Date Timestamp, Logged By, Change Type, Change Description.

Checklist is an entity typically structured under an entity referred to Process. A checklist can be associated with each process activity. Checklist includes a list of tasks that must be completed or "checked off" before a completion date can be entered for a given activity. Data includes, but is not limited to: Done Checkbox, Task Name, Target Date, Finish Date, and Role Responsible.

Contract is typically structured as a primary entity and under the Work Packet entity. A contract is a legal document which lists line items that the Purchaser agrees to buy from the organization who is awarded the contract. Data includes, but is not limited to: Contract ID, Cost Type, Change Type, Contract Status, Contract Description.

Costs is an entity, typically structured under the Project entity. Its purpose is to collate and track costs. Costs are expenditures related to a project, program or event. Data includes, but is not limited to: Man Hours and Cost Amount. Calculation summaries include, but are not limited to: Internal Costs, External Costs, Other Costs, Total Costs at any level from project, phase, work class or activity code level. A Last Cost Sync field is automatically populated if there is an integration with a legacy Job Cost Accounting module.

E-Mail Address is a component entity, typically structured under Organization and Person. E-Mail Address is used to capture one or many e-mail addresses. Data includes, but is not limited to: E-mail Type, E-mail Address.

Encumbrances is an entity which generally comprises a financial document, that is used by a city's accounting department, to "set aside" approved encumbrance dollar amounts for contracts. Funds must be encumbered by a city before contractors can be paid. Data includes, but is not limited to: Encumbrance ID, Ordinance ID, Contract Change #, Encumbrance Amount.

Estimate is an entity, typically structured under Project. There can be many estimates per project. Estimates reflect the estimated cost of a project, program or event. Data includes, but is not limited to: Internal Amount, External Amount, Contingency Amount, Overhead Amount, Total Amount, per phase and work class level.

Fund Pool is an entity, typically structured under Fund Source. The fund pool entity includes information relating to a pool of money, for a stated fiscal year, for a Fund Source. There can be many Fund Pools (i.e. FY1999, FY2000, FY2001 . . . ) for a single Fund Source, such as, an annual Capital Improvement Fund Budget. Data includes, but is not limited to: Pool Fund Year (FY), Fund #, Department, Organization Code, Available Funding Begin Date, Available Funding End Date, Planned Pool Amount, Planned Pool Balance, Authorized Pool Amount, Authorized Pool Balance.

Fund Source is an entity, typically structured as a primary entity. This is the source for the fund. Data includes, but is not limited to: Fund Name, Sub Fund Name, Description, Fund Scope, Funding Entity, Coordinating Agency, Fund Category, Fund Type.

Funds per Project is an entity, typically structured under Project and Fund Pool. Data and calculated fields include, but are not limited to: Project, Planned Amount, Authorized Amount and Programmed Amount.

Funds per Phase is an entity, typically structured under Funds per Project. Data and calculated fields for the Funds per Phase entity include, but are not limited to: Phase, Planned Amount, Authorized Amount and Programmed Amount.

Line Items is a component entity, typically structured under Bid and Contract. Line Items can be materials (e.g. 36" concrete pipe) or services (e.g. clearing & grading). Line Item data includes, but is not limited to: Line Item #, Calculation Type (base, alternative1, alternative2), Line Item Name, Quantity, Units of Measure (linear feet, square feet, acres, etc.).

Location is a component entity, typically structured under Project and Asset. The Location entity identifies the location of a project or asset. Data includes, but is not limited to: Type (at address, near address, segment, intersection, bound area, on alley, on street); Numeric Address; Block From; Block To; Cross St.; North Boundary; East Boundary; South Boundary; West Boundary; Geocode Latitude and Longitude.

Location Boundary is a component entity, typically structured under Project and Asset. Location Boundary describes the legal or other boundaries where a project or asset resides. Typically used by Council District or Neighborhood Representatives to print reports showing all projects in their district or neighborhood and the project status. Data includes, but is not limited to: Boundary Definition Type (Council District, Neighborhood, Sewer District), Boundary Definition, % in Area.

Master Bid is an entity typically structured under Master Project. It allows bids to be issued for a group of projects. Data includes, but is not limited to: Master Bid ID, Bid Name, Bid Type, Bid Status.

Master Contract is an entity typically structured under Master Project. It allows contracts to be issued for a group of projects. Data includes, but is not limited to: Master Contract ID, Cost Type, Change Type, Contract Status, Contract Description.

Master Projects is an entity typically in the form of a link to Project. This entity is used to "group" projects so Master Bids, Master Contracts or Master Funding can be accomplished. Data includes, but is not limited to: Name, Scope/Purpose.

Memo is a component entity, typically structured under entities, such as Project, Bid, Contract, Fund Source, Project Funding, Petition, etc. Memo allows a user to make context-sensitive memos (notes) that are easily tracked and displayed. Data includes, but is not limited to: Memo Date, Share Value, Subject, Action, Due Date, Memo.

Ordinances/Resolutions is an entity typically structured under Project and Contract. An Ordinance is a legislative document that legally binds a city or county, and conveys the agreement along with the authorized funding and encumbrance dollar amounts. A Resolution is similar, but does not legally bind. Data includes, but is not limited to: Ordinance/Resolution ID, Ordinance/Resolution Date, Ordinance/Resolution Type, Total Amount, description.

Person is a component entity, typically structured under Organization or it may be structured as a primary entity. This structuring will allow the user to see persons by name or persons within their employer's organization level. Person data includes, but is not limited to: Prefix, First Common Name, First Formal Name, Last Name, Suffix, Salutation, Title, Professional, Employer Organization, Member Status.

Personnel is a component entity, typically structured with entities, such as Project, Bid, Contract, Fund Source, and Petition. This entity can be used by a manager to track the personnel who are involved in the Project, Bid, Contract or other entity. Security permissions looks at the Personnel list to allow those people security rights to that specific project, bid, contract or other entity. Data includes, but is not limited to: Primary Organization, Entity Role, Person, Start Date, End Date.

Petition is an entity, typically structured under Project. A petition is a public document associated with a given topic/project, that a group of people (usually citizens) sign to show their support for the stated topic. Data includes, but is not limited to: Petition #, # of Signatures, # of Parcels, Hearing Rate, Estimated Assessable Amt, City Cost.

Phase is an entity, typically structured under Project. Phases are stages of a project (e.g. Design, Right of Way, Construction). Phase data includes, but is not limited to: Phase Name, Phase Status.

Phone is a component entity, typically structured under Organization and Person. Phone data includes, but is not limited to: Phone Type, Phone Number, Extension.

Process is a component entity that includes a list of sequenced activities to be completed for that entity. Data includes, but is not limited to: Activity Name, Target Start Date, Target End Date, Actual Start Date, Actual End Date, Role Responsible, Person Responsible, Checklist, Procedures.

Project is a component entity, used with both Master Plans and Master Project entities. Project data includes, but is not limited to: Name, Project #, Time Charge #, Original Scope, Current Status, Project Status, Original Source, Original Date.

Request is typically structured as a primary entity and generally includes data to identify a request for some form of public works project. The data collected or associated with the request entity can vary depending upon the type of request made (e.g. sidewalk repair request, parade request, etc.). Request data may include: Request Type, Request #, Description, Date Requested, Requestor Name, Address, Phone and E-mail, and variable fields based upon Request Type.

Role is an entity which is typically structured under Person. Each role is assigned various security rights for each entity and selected secured fields. A person can have many roles within many organizations. Role data includes: Role Name, Organization Role.

Timesheet is an entity which is typically structured as a primary entity.

Timesheet data includes: Project-Phase-WorkPacket, Actual Time, Chargeable Time, Adjusted Time, Date, Hours Spent.

Work Packet is an entity which is typically structured under Phase. Work Packets indicate the work to be done relative to a contract. Work Packet data includes: Work Class Name, Phase, Description.

Entity Grids

FIG. 3 is an example of an entity grid or template 140 generated by the computer system 1 to enable the collection of data associated with an entity, in this case an address entity. The address entity grid 140 includes an address type box 141 with a drop down box 142 to allow the user to select from among options such as residential or postal. The address entity grid also includes boxes to collect the following address data: street address 143, city or place 144, state or province 145, postal code 146, country 147, county 148, and time zone 149. The grid 140 also includes address usage boxes 150 which can be selected to indicate for what purpose the address is to be used, including as a mailing address, a shipping address or a billing address. Place type box 151 is used to indicate the type of place selected in the city or place box 144.

Share Value

The entity grid 140 also includes a share value indication box 155 with a share value sum 157 included therein. A drop down box 159 is also provided next to the share value indication box 155, which when selected opens a share value selection table 160 (FIG. 5) which can be used to select a share value sum 157 as discussed in more detail below. The share value sum 157 generally comprises a numerical indication of who the user has selected to be able to access the data entered in the entity grid 140. The share value or share value sum 157 is then used and analyzed by the computer system 1 to determine who can access the data.

When data is entered into the computer system 1 through an entity grid, such as grid 140, the context by which data is entered into the computer system 1 is saved in association with the data or data entity. In other words, the computer system 1 records who entered the data in terms of the user's role and organization, along with other context of the entity.

As discussed previously a share value selection table 160, which may be used to assign a share value sum 157 to a data entity is shown in FIG. 5. The share value selection table 160 is generated upon selecting the drop down box or similar icon 159. The share value selection table 160 includes a first column including a hierarchical listing 161 of role and/or organization levels with which an authorized user may want to provide viewing rights or other access rights for selected data. The table 160 also includes a second column including a unique share group or share value addend 162 in increasing order which is associated with each successive role and/or organization level. The share value selection table 160 also includes a share value selection box 163 associated with each role and/or organization level and which may be selected by a user, by selecting or clicking on the selection box 163, to indicate that viewing or other access rights are to be assigned to the corresponding role and/or organization level on the same row.

The share value sum 157 is the sum of the share value addends 162 associated with each of the selected roles and/or organization levels 161. The illustrated share value addends 162 assigned to the role and organization levels 161 are assigned such that each successive share value addend is twice the previous share value addend (i.e. the sequence 1, 2, 4, 8, 16 ... 2(n−1)). The sum of any of the share value addends produces a unique number or share value sum which can be analyzed by the computer system 1, using conventional mathematical techniques, to determine which share value addends were selected.

For example, a share values sum of 1 indicates that the data is only to be accessed by the user who submitted the data originally. A share value sum of 18 indicates that the data may be viewed by anyone associated with the user's organization (share value of 2) or that organization's sibling organizations (share value of 16). The computer system 1 may be programmed to always permit the party submitting data to view it when using the system in the same context as when the data was submitted (i.e. in the same role for the same organization) even if the selection box for private is not selected.

Referring to FIG. 5, the table 160 can provide a selection of all associated with the highest listed share value to permit a user to indicate that the data entity may be viewed by anyone with access to the computer system 1. In the illustrated table, the share value of 32 indicates a permission for all to view. Alternatively, a greater number of share values can be employed, depending on the level of classification required. It can be seen that the manner of listing the organizations and individuals or roles to which access is to be permitted can be widely varied while still providing the user a simple means of specifying who may have access to the data.

Web-Based User Interface

Figure 7:
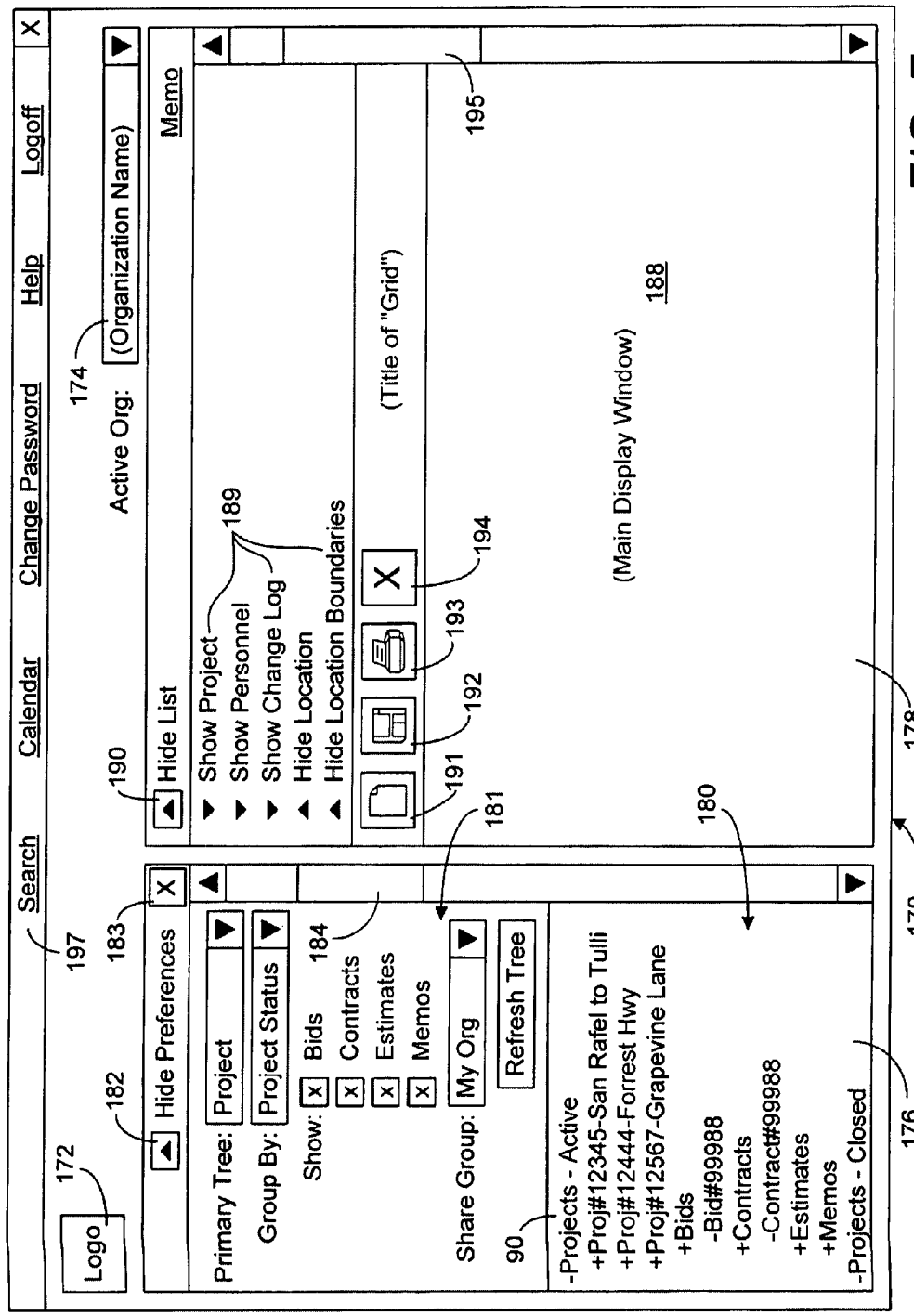
FIG. 7 is a diagrammatic representation of a web based user interface to the multi-organizational information management system of the present invention.

FIG. 7 illustrates an exemplary user interface web page 170 which is generated by the web-based user interface 36 of the system 1. The page 170 represents what a user 15 or 38 or an administrator 5 or 10 would see upon accessing the system 1 through the internet 42 and system security 44. What a given user 15, 38, 5, or 10 actually sees depends on the identity of the user, the currently logged role of the attached user, and the currently logged organization of the user. Each page 170 is a web application, or set of web applications, that is processed by the user's web browser to enable access to and, in some cases, modification of, certain entities 90 within the system 1, based on the current context of the user's identity, role, and organization. The pages 170, and applications therein, may be implemented using conventional hypertext markup languages (HTML), Java, and/or other web related softwares.

Certain aspects of the page 170 can be customized for each organization by the subscriber administrator 10 or system administrator 5, such as color theme (not shown), displayed organization logo 172, and field dropdown values. The display of organization specific graphic aspects to the page 170 has a functional advantage by indicating the current organizational context. Some users 15 are enrolled under multiple organizations 2 and are permitted to select any of such organizations whose data entities 90 they wish to access. Selection of the currently active organization is accomplished using an organization selection drop-down menu box 174 on the page 170.

The illustrated page 170 is divided into two principal sections: a data entity tree section 176 and a data entity grid section 178. The tree section 176 displays an entity tree 180, as selected and filtered by tree preference controls 181. The preference controls 181 generally enable the user 15 to select the desired primary data entities 92 they wish to access, within the context of the user's role and selected organization. Additionally, the user 15 may select the content of the component entities 94 of the selected primary entities 92 to be displayed and the order in which they are displayed. The content of the preference controls 181 is context sensitive, based on the entity tree 180 selected to be displayed and, additionally, based on some of the preferences which are selected.

The multilateral relationships among the entities 90, as determined by the entity structure 96 (FIG. 6), along with flexibilities built into the page 170 enable the user 15 to access the entities 90 in ways that are most beneficial to the user. For example, the illustrated tree 180 displays projects grouped by project status and includes bids, contracts, estimates, and memos, all ordered by current status (active, closed on-hold, etc.). Alternatively, the user 15 could cause a tree 180 to display memos, which might include memos related to projects and other subjects, by appropriate operation of the preference controls 181. The preference controls 181 may be hidden, using a preferences toggle 182, to maximize the display of the tree 180. Additionally, the tree section 176 may be closed to maximize the grid section 178, using a close button 183. The section 176 may also include scroll bars, such as a vertical scroll bar 184, to enable the user to scroll through an extended tree 180, or an extended set of tree preference controls 181.

The grid section 178 is used to display data entity grids 140 (FIG. 3) associated with a data entity 90 which is graphically selected from the entity tree 180. Grids 140 associated with an entity 90, as enabled by the tree preference controls 181, are displayed within a main display window 188, as further controlled by context sensitive list controls 189. The illustrated list controls 189 are show/hide toggles by which the user 15 may display and, as appropriate, insert or update information within the data fields of the listed entity grids 140. The list controls 189 may be hidden or displayed, using a list preferences toggle 190. The grid section 178 includes standard grid function controls, such as new 191, save 192, print 192, delete 193, or the like for actions related to the displayed grids 140. The page 170 may generate dialog boxes (not shown), for example to remind a user to execute a save operation using the save button 192, if data within a displayed grid 140 is changed. The grid section 178 may include scroll bars, such as the illustrated vertical scroll bar 195, for scrolling through displayed grids 140 or through a single grid 140 whose size exceeds the size of the window 188.

The interface page 170 may include a global menu 197 with various entity selecting and manipulating functions. The menu 197 and its content of functions may be customized for each organization 2, depending on the data processing needs of the particular organization. The features described with respect to the illustrated page 170 are intended to be exemplary, and the system 1 is not intended to be limited to any particular configuration of a user interface 36.

Computer System Applications

Figure 8A:
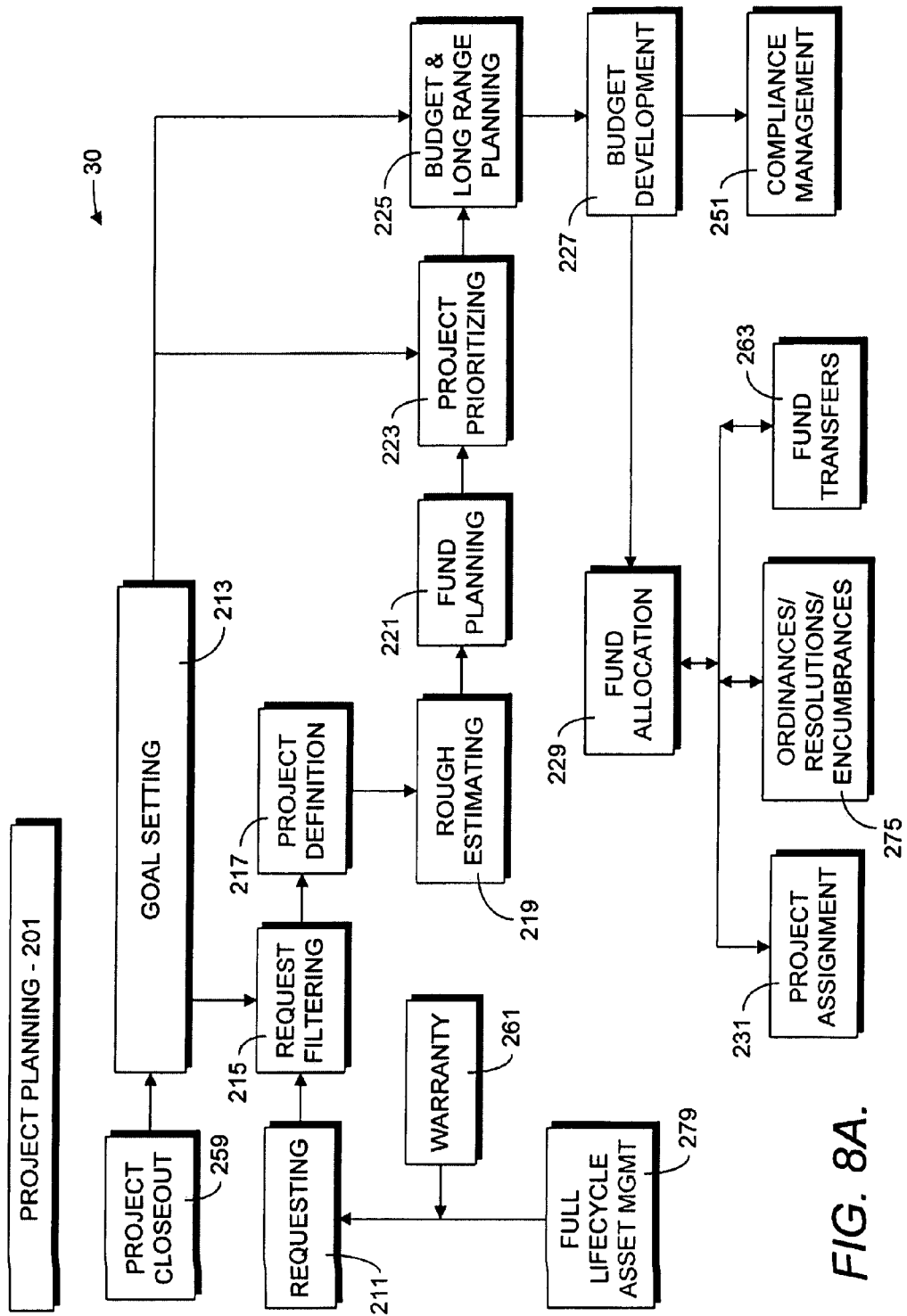
FIGS. 8a-8c illustrate application components of a full life cycle, multi-organizational, information management system according to the present invention for long-term management and tracking of business activities of a plurality of cooperating organizations.
Figure 8B:
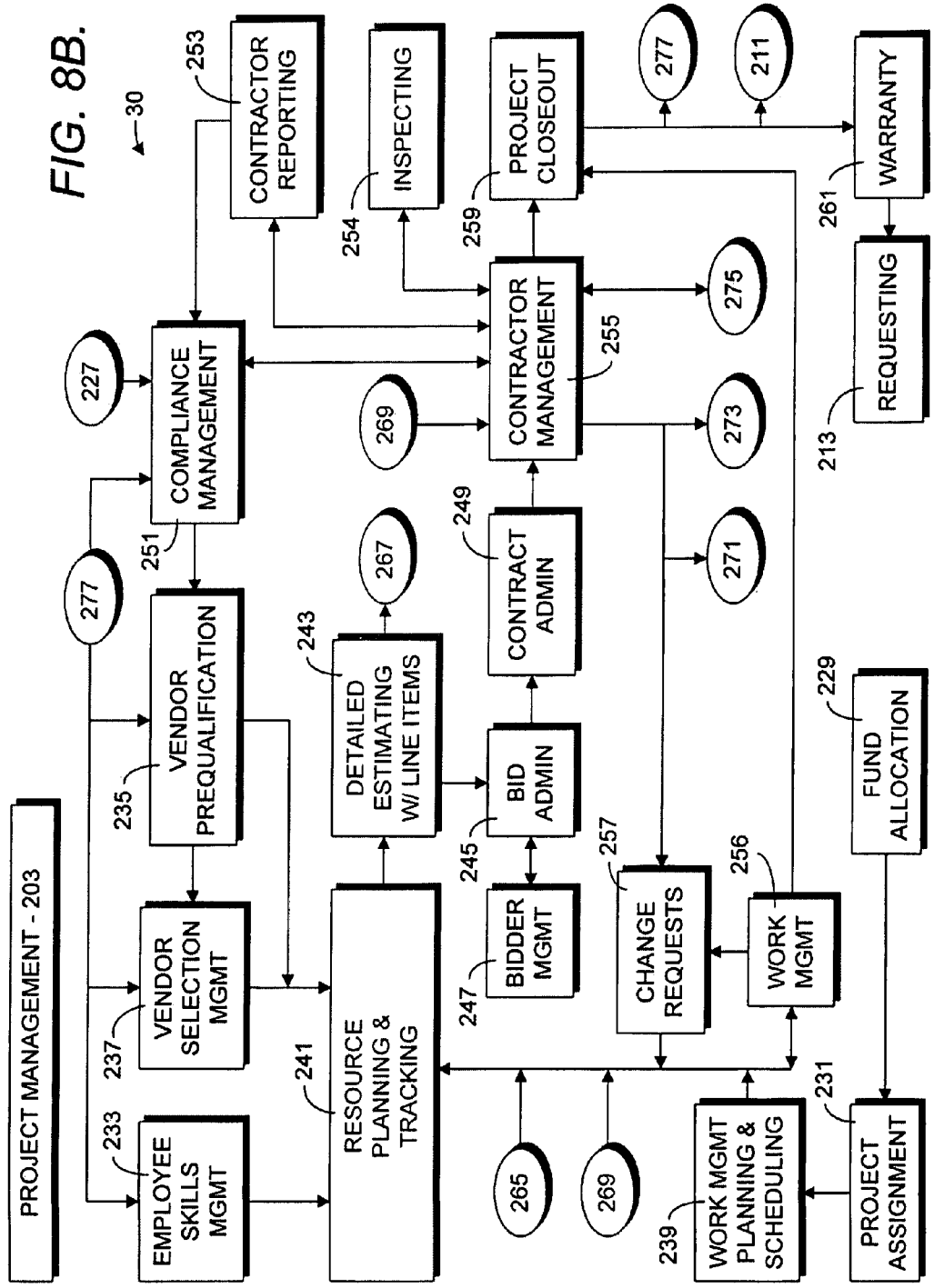
Figure 8C:
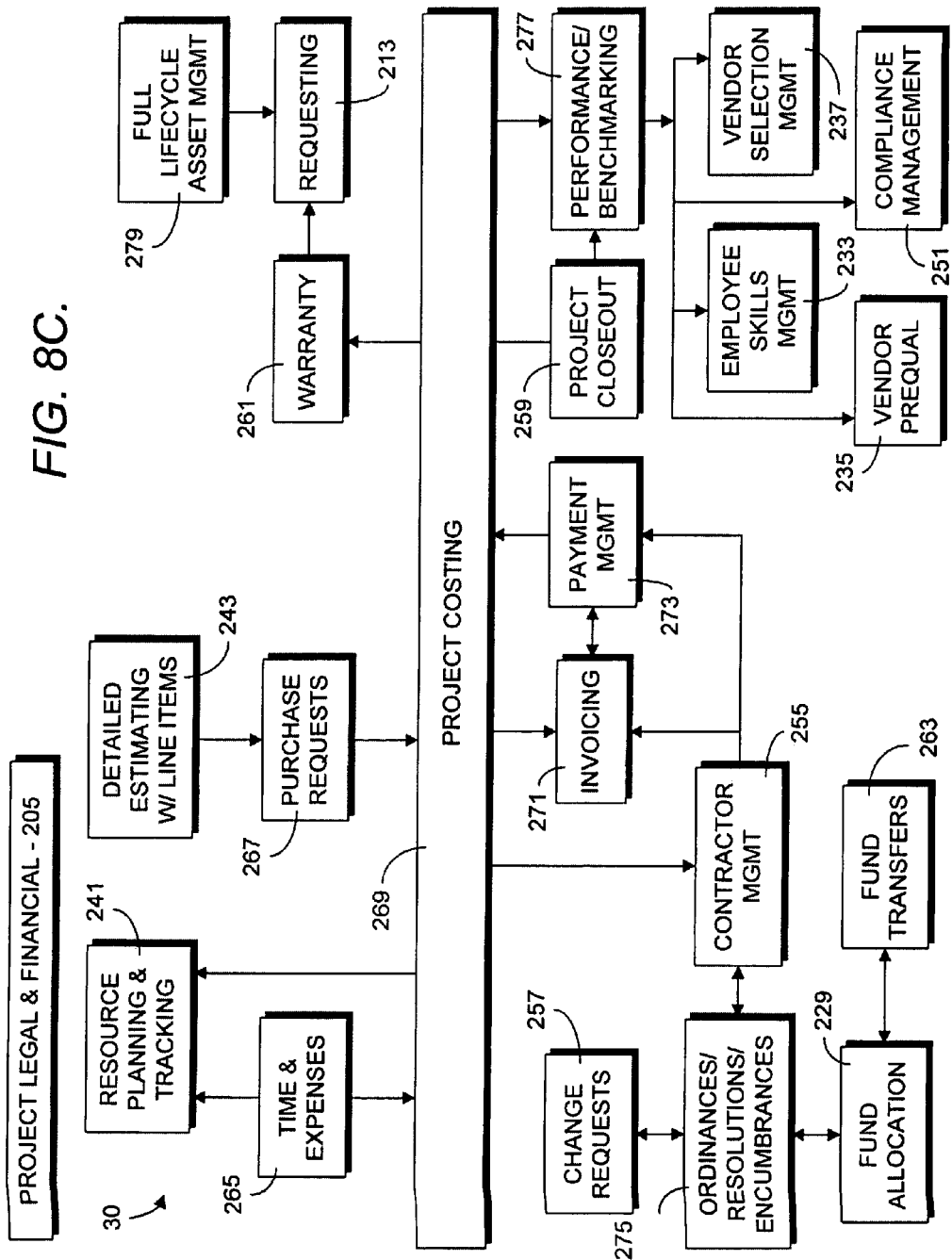

The computer system 1 (adapted for public works projects) incorporates a fairly comprehensive set of data processing applications or procedural modules 30 designed to implement and facilitate the activities and tasks undertaken throughout the project lifecycle. These applications, shown in FIG. 8, generally fall into one of three main categories: Project Planning 201 (FIG. 8*a*), Project Management 203 (FIG. 8*b*), and Project Legal and financial 205 (FIG. 8*c*). It is to be understood that the categories under which the applications are listed are generalized and not intended to be limiting but are done to help facilitate an understanding of the process and applications which may be utilized or undertaken with the computer system 1.

Each of the boxes shown in FIG. 8 generally represents an application that can be used to perform a function or gather data regarding various steps, phases or actions undertaken during the project lifecycle. The data gathered typically is stored as one of the data entities discussed previously. The arrows provide a general indication of the sequence in which these applications are utilized and linkages between applications for collecting and sharing data. However it is to be understood that the applications are not necessarily run in the order shown and it is foreseen that data collected from any one application can be accessed by and utilized by any of the other applications. Some of the applications are used on a project by project basis (i.e. project definition and detailed estimating), while others are more generalized applications to collect data and information which can be utilized for multiple projects (i.e. long range planning and vendor pre-qualification). It is also to be understood that the applications described and listed are also representative of process steps or activities which can be performed by a user in utilizing the computer system.

The applications, process steps or activities occurring under the category of Project Planning 201 include: requesting 211; goal setting 213; request filtering 215; project definition 217; rough estimating 219, fund planning 221; project prioritizing 223, budget and long range planning 225; budget development 227 and fund allocation 229.

The applications, process steps or activities occurring under the category of Project Management 203 include: project assignment 231; employee skills management 233; vendor pre-qualification 235; vendor selection management 237; work management planning and scheduling 239; resource planning and tracking 241; detailed estimating with line items 243; bid administration 245; bidder management 247; contract administration 249; compliance management 251; contractor reporting 253; inspecting 254; contractor management 255; work management 256; change requests 257; project closeout 259 and warranty 261.

The applications, process steps or activities occurring under the category of Project Legal & Financial 205 include fund transfers 263; time & expenses 265; purchase requests 267; project costing 269; invoicing 271; payment management 273; ordinances/resolutions/encumbrances 275; performance/benchmarking 277 and full lifecycle asset management 279.

Project Planning 201: Project planning 201 for a particular project generally begins with the requesting application 211.

Requesting: The requesting application 211 generates a project request form (not shown) accessible by users (e.g. citizens or city employees) through the website. The user may complete and submit a project request form providing data concerning the request (the request entity) which is then captured and stored by the computer system 1 in the database when the user submits the request. The requesting application 211 utilizes pre-established organization specific business rules for routing submitted requests to other users.

Goal Setting: The computer system 1 includes a goal setting application 213 which is utilized to allow participating organizations to establish goals. These goals can then be linked to and utilized in other applications such as request filtering 215, project prioritizing 223 and budget and long range planning 225. The goal setting function performed by application 213 generally begins prior to project planning for any particular project and continues through the life of the projects and after the projects. Data gathered on one project can be used to set goals for future projects.

Request Filtering: The request filtering application 215 is then used by an organization through one of its users (e.g. request evaluator) to eliminate duplicate or infeasible requests submitted through the requesting application 211. The request filtering application 215 allows a user to provide an indication of whether the application has been rejected or approved (at least preliminarily) and the filtering application 215 can generate a notice to send to the requester notifying the requester of the decision, such as through an e-mail response.

Project Definition: As used herein the term project may refer to projects, programs, incidents, events, actions, operations, or exercises. After a project request has received preliminary approval from request filtering 215, the project definition application 217 is utilized to more clearly define the project which is the subject of the request. Project data entered into the system from the original submission can be accessed and incorporated into a project definition or project entity. Authorized users, who may be referred to as project initiators, enter additional information, data or documents into the system 1 using the project definition application 217. Depending on the nature of the project, users from more than one organization may have authorization to modify the project definition. The project definition may include a statement of the scope of the project, the type or project or asset (i.e. bridge or road) and the location of the project including legal boundaries and possibly maps and photos. Standardized project templates can be created and copied to quickly set up new projects.

Rough Estimating: After a project entity is created using the project definition application 217, a user can use the rough estimating application 219 to create a rough estimate of a project. The rough estimate typically will be in the form of a lump sum cost estimate based on a search of the system for previous estimates for similar projects or actual project cost information for similar projects.

Fund Planning: Once a rough estimate for a project has been established, a user (e.g. Fund Manager/Planner) can use the fund planning application 221 to search for potential funds that can be used on various types of projects and setup fund pools (a fund pool entity). Typical funding sources for road type public works projects might include federal funds, such as TEA-21 highway funds, or fund pools managed by states, counties, councils of governments or cities.

Project Prioritizing: The project prioritizing application 223 is used to prioritize projects using project precedence relationships (e.g. projects dependent upon completion of other projects or actions) and subscriber defined criteria. The prioritization functionality can be used by various organizations including the governance organization involved and contractors.

Budget and Long Range Planning: The budget and long range planning application 225 allows the user to create budgets and long range plans, such as the Department of Transportation 20 year Highway Plan, using standardized templates, to enable council of government, state and federal long range planners to quickly aggregate the plan data at any governmental level (e.g. city, county, council of government, state, federal).

Budget Development: The budget development application 227 provides the user with the capability to prioritize and approve budget lists in compliance with government regulations to create designated periodic budgets over any defined time frame.

Fund Allocation: The fund allocation feature 229 allows designated users to manage fund sources and fund pools allocating fund pools from the source down to the specific project phase. For federal funds, such as TEA-21 highway funds, this application allows Federal Fund Managers to manage federal fund pools and apportion to states. It also allows state fund managers to manage state fund pools and apportion to cities, counties or councils of government. It also allows fund managers for councils of governments to manage funding for multi-jurisdictional projects, as well as allocating council of government fund pools to various cities. It also allows city fund managers to allocate funds to specific projects, even down to specific phases (e.g. design, construction, etc) with business rules applied to manage limits for funding application. The system also allows fund managers to track important deadline dates related to fund applications, fund reporting or fund reimbursements. Reports which can be generated include grant, bond, TIP, TIF and other agency rollups from local city to council of governments to state to federal levels.

Project Management 203

Project Assignment: Continuing with reference to FIG. 7, the project management applications generally begin with a project assignment application 231 which can be utilized by participating organizations in assigning project managers to projects.

Work Management Planning & Scheduling: This is an application to pull standardized activities and checklists and assign person responsibilities with the ability to track target and completion begin/end dates. Internal and external scheduling information from multiple organizational, project, and personal calendars can be combined to create comprehensive lists of action items by topic.

Employee Skills Management: The employee skills management application 233 allows the subscriber community to establish and maintain a database of employee capabilities based upon standardized definitions of knowledge, skills, training and other abilities that relevant employees of participating organizations might possess. The employee skills management application 233 preferably allows the capture of information for verifying employee competency in performing particular critical skills, including performance evaluations and the like.

Vendor Pre-Qualification: The vendor pre-qualification application 235 similarly allows the subscriber community to establish and maintain a database of available resources (i.e. vendors including contractors and subcontractors). The application 235 captures data regarding skills and abilities offered by each organization or vendor and an associated objective rating of past performance.

Vendor Selection Management: The vendor selection management application 237 allows users, such as project managers, to obtain a listing of or select vendors or other team members having particular qualifications. The application may also be used to narrow the field of candidate organizations or personnel to a short-list using either pre-qualification data, key personnel skill data or both. The application also allows users to maintain and report selection criteria and system decision logic.

Resource Planning and Tracking: The resource planning and tracking application 241 allows a user to search for available personnel, vendors and other resources and assign them to projects by role or individuals generally through links to the employee skills management application 233, the vendor pre-qualification application 235 and the vendor selection management application 237 as well as other data stored in the computer system. The resource planning and tracking application 241 also allows users to view current personnel assignments and personnel qualifications and to notify personnel of their acceptance on a project.

Detailed Estimating: The detailed estimating application 243 allows users to develop detailed cost estimates for projects or cost entities. The estimate is made in accordance with project structure selected using predefined activity codes aligned with appropriate project structure levels. The detailed estimating application 243 includes the ability to aggregate estimates per the project structure at various organizational levels. Standard estimating templates can be selected for use by the users (typically engineers) performing the detailed estimates.

Bid Administration: The bid administration application 245 is utilized by bid coordinators and managers to develop a request for bids in the form of a bid packet (work packet entity) that can be delivered to prospective bidders. The bid packet generally includes a bid response form and any related specifications and drawings. Using the bid administration application 245, a user can select prospective bidders using predefined selection criteria. Prospective bidders can then submit their bids using the bid administration application 245. The bids, or bid entities, may include bidder qualifications and associated specifications, drawings and qualification documents which are then captured by the computer system. The application 245 then allows bid managers to manage bid responses and bid awards, including displaying comparative bid responses and reports, and further includes the capability of electronically sending formal bid award notifications.

Bidder Management: The bidder management application 247 can be used to manage bidders and sub-bidders, including electronic routing to obtain appropriate electronic signatures, per predefined business rules, and then routed to other users for further processing. The bid management application 247 includes the ability to roll up bid line items from all sub-bidders, so the primary bidder can prepare a consolidated bid response for the organization requesting bids, such as a city.

Contract Administration: The contract administration application 249 allows users to develop and manage contracts and support documents, including, but not limited to, such items as insurance, change orders, subcontracts, retained funds and ratings. The contract administration application 249 also allows users to manage contractors using predefined contract management milestones, including aggregating all contracts and inspection reports.

Compliance Management: The compliance management application 251 can be used to manage the goals and performance relating to participation in a project by disadvantaged, minority and woman business enterprises ("DBE's", "MBE's" and "WBE's" respectively). The compliance management application 251 communicates with the vendor prequalification application 235 to allow tracking of what contractors on a project qualify as a DBE, MBE or WBE and whether the contractors used meet required goals.

Contractor Reporting: The contractor reporting application 253 allows users, typically the primary contractor, to roll up timesheets from all contractors and subcontractors to prepare consolidated contractor payroll reports. The application 253 can also be used to generate a pay request and invoice for the contracting organization. A web form is generated by the application 253 to allow contractors to submit the contractor payroll reports on-line and to access status reports showing contractor balances, in terms of working days and amount.

Inspecting: The inspecting application 254 allows a user to enter inspection notes and memos with the ability to electronically mail notifications and create "emergency stops" to freeze or stop the workflow process, so no work is done on the project until the stop is lifted.

Contractor Management: The contractor management application 255 is an application allowing users to manage contractors and subcontractors including the ability to electronically route documents including reports for appropriate electronic signatures, per predefined business rules, then route the document to another user for processing.

Work Management: The work management application 256 allows users to generate, issue and complete confirmation of work orders including electronic routing for the appropriate electronic signatures, per predefined business rules, and then route the documents to another user for processing. The work management application 256 is typically used by supervisors to issue work orders for cleaning crews, mowing crews, maintenance personnel, etc. for work programs or authorizing subcontract work.

Change Requests: The change requests application 257 allows users to manage project change requests including electronically routing project change requests and notification of the change requested to the appropriate user. The change requests application 257 permits tracking of all of the added work related to the change request.

Project Closeout: The project closeout application 259 allows users, such as Project Auditors and Project Managers, to review information concerning the project including, final costs, deliverables, personnel performance and project completion. The application 259 permits the user to set follow-up notifications for warranty tracking of contractor work.

Warranty: The warranty application 261 allows users to track warranty information and set rules to trigger automatic project requests at specific times during the warranty timeline.

The remaining applications generally fall under the heading of Legal & Financial 205.

Project Legal & Financial 205

Fund Transfers: The fund transfers application 263 communicates with the fund allocation application 229 to allow users, such as funding or financial managers, to transfer funds or allocations of funds between projects or phases.

Time & Expenses: The time & expenses application 265 generates internet accessible, pre-defined entry forms such as timesheets and expense reports which can be completed by users and automatically routed by designated business rules, to appropriate managers to approve time and expenses before forwarding the appropriate report exports to other users for processing. The time & expense application 265 also permits a user to approve or reject the reports and notify the submitting party or other users accordingly. The time & expense application 265 also can be used to assist in the completion of the user timesheet using information already entered in the system. The time & expense application 265 communicates with the resource planning and tracking application 241 and the project costing application 269 to share the time and expense data collected thereby.

Purchase Requests: The purchase requests application 267 allows users to capture and track purchase requests with a predefined web data entry form, including electronic routing for the appropriate electronic signatures, per predefined business rules, then routing to Accounting personnel for processing. This application 267 also communicates with the project costing application 269 and the payment management applications 273 to share the accumulated data on purchase requests.

Project Costing: The project costing application 269 allows users to establish project costing structures, including cost aggregation at any level, creating data export files to the users, and the ability to have each organization or governance community define its cost methodology.

Invoicing: The invoicing application 271 allows user vendors to generate vendor invoices either manually or as a rollup from time and expense data, that can be attached to a pay request including electronic routing for the appropriate electronic signatures, per predefined business rules, then routing to the project owner for processing. The invoicing application 271 also allows a governance organization to create and manage invoices for citizens to pay a portion of the public works project costs.

Payment Management: The payment management application 273 allows users to manage pay requests using a predefined web data entry form, with the option of attaching a document or image to the form. The payment management application 273 further allows a user to electronically route pay requests for the proper electronic signature verification prior to routing for payment processing. The application 273 also allows the verification of support documentation (e.g. field inspection reports) prior to payment.

Ordinances/Resolutions/Encumbrances: The ordinances/resolutions/encumbrances application 275 allows users such as legal document coordinators, to manage and track legal documents related to funding and contracts. The legal documents which can be tracked include ordinances (legal documents allocating funds or initiating action), resolutions (documents promising funds or future action), and encumbrances (transactions actually placing money in accounts so contractors can be paid).

Performance and Benchmarking: The performance and benchmarking application 277 allows users to track, using the shared knowledge repository, performance measurement reports for designated periods including the creation of performance benchmarks, and further the automatic comparison of these benchmarks against actual performance. The performance and benchmarking application 277 provides for an independent assessment tool separate from system captured statistics as well as a feedback mechanism for contractor qualifications and personnel performance ratings. The performance and benchmarking application 277 closely communicates with several of the management applications to permit use of the performance and benchmarking criteria in managing subsequent projects. These applications include employee skills management 233, vendor pre-qualification 235 vendor selection management 237, and compliance management 251.

Full Lifecycle Asset Management: The full lifecycle asset management application 279 allows users to track assets (i.e. the object of the project such as roads or bridges and the needed resources), throughout the project lifecycle, including various regulatory compliance rules and attributes which help classify and track assets with the automatic triggering of project requests to initiate such items as, road resurfacing or bridge repairs. Also the full lifecycle asset management application 279 and the warranty application 261 communicate with the requesting application 211 to automatically create project requests based upon maintenance schedules or conditions of assets or warranty terminations. The processing of these new requests through project planning and project management and completion can also be facilitated and tracked using the computer system 1. The utility and effectiveness of the computer system 1 increases as the system acquires greater knowledge and information from previous projects.

Although the system 1 has been described with a exemplary embodiment particularly involving municipal government operations, the system 1 is not intended to be restricted to such use. It is foreseen that the system 1 could be advantageously employed in numerous types of complex activities including, but not limited to, military activities, emergency preparedness and response such as activities of the Federal Emergency Management Administration (FEMA) and the like, homeland defense activities, and so forth. Common factors associated with such activities which are addressed by the system 1 include: multiple jurisdictions of governmental authority; multiple organizations, both profit and non-profit, which provide goods and services related to such activities; and multiple sources of funding for such activities; and multiplicities of reporting requirements for allocations and expenditures of funds for such activities.

It is to be understood that while certain forms of the present invention have been illustrated and described herein, it is not to be limited to the specific forms or arrangement of parts described and shown.

What is claimed and desired to be secured by Letters Patent is:

1. A method for selectively controlling access to data records entered into a database system of a computer system by a user and comprising the steps of:
   (a) establishing an ordered listing of individuals or organization levels of a plurality of related or unrelated organizations including government agencies, corporate entities, and the general public with which a user provides access to a data record entered by said user;
   (b) assigning in succession to said ordered listing of individuals and organization levels a share value addend wherein a value of each successive share value addend is twice a value of the previous share value addend;
   (c) establishing data record ownership of each data record upon entry of said data record into said computer system by associating said data record with an organization identified by the data entering user who enters said data record;
   (d) enabling said data entering user to select from said ordered listing of individuals or organization levels those individuals or organization levels with which said data entering user wants to provide access to said data record;
   (e) summing the share value addends associated with the selected individuals and organizations to obtain a share value sum and associating said share value sum with said data record;
   (f) providing potential access to said data records of said database system using an Internet user interface over a universal computer network; and
   (g) providing or denying access to each data record at a time access is requested based on the then current share value sum and the relationship between the data owner and the organization of the individual attempting access to the particular data record.

2. A method as set forth in claim 1 and including the step of:
enabling said user to select a subset of data records from all data records that are accessible to said user based on the share value sums thereof.

3. A method as set forth in claim 1 and including the step of:
managing access by a system administrator to a database system of data records related to activities among said plurality of related and unrelated subscriber organizations and including the steps of:
   (1) said system administrator assigning subscriber administration rights to a respective subscriber administrator of each subscriber organization, said subscriber administration rights including a rule for assigning data record access permissions to specific personnel of the associated subscriber organization; and
   (2) said subscriber administrator assigning data record access permissions to selected personnel of said associated subscriber organization of said respective subscriber administrator, said permissions including a rule for enabling access to some data records to personnel of other subscriber organizations and access to some data records by the general public and a rule for denying access to other data records to personnel of other subscriber organizations and the general public.

4. A method as set forth in claim 3 and including the steps of:
said system administrator defining a plurality of personnel roles, each role having an associated set of permissions for selected types of access to some types of data records;
said respective subscriber administrator assigning at least one personnel role to each of said subscriber personnel; and
each of said subscriber personnel gaining said selected types of access to said some types of data records by way of said personnel role assigned thereto.

5. A method as set forth in claim 3 and including the steps of:
said system administrator defining a plurality of data entity templates, each data entity template including a particular set of data fields to receive and record data pertaining to operations of a subscriber organization as a data entity;

said system administrator defining a plurality of personnel roles, each role having an associated default set of permissions for selected types of access to a selected set of data entities;

said respective subscriber administrator assigning at least one personnel role to each of said subscriber personnel; and each of said subscriber personnel gaining said selected types of access to said selected set of data entities by way of said personnel role assigned thereto.

6. A method as set forth in claim 3 and including the step of:

said system administrator providing said subscriber administrator with a rule for modifying said default set of permissions for selected types of access to said selected set of data entities for roles associated with said subscriber organization with which said subscriber administrator is employed.

\* \* \* \* \*